United States Patent
Shoihat (10) Patent No.: US 11,336,603 B2
(45) Date of Patent: May 17, 2022

(54) SYSTEM AND METHOD FOR MESSAGING IN A NETWORKED SETTING

(71) Applicant: Boris Shoihat, Or Akiva (IL)

(72) Inventor: Boris Shoihat, Or Akiva (IL)

( * ) Notice: Subject to any disclaimer, the term of this patent is extended or adjusted under 35 U.S.C. 154(b) by 15 days.

(21) Appl. No.: 14/634,747

(22) Filed: Feb. 28, 2015

(65) Prior Publication Data

US 2016/0255030 A1    Sep. 1, 2016

(51) Int. Cl.
*H04L 51/42* (2022.01)
*G06F 3/04817* (2022.01)
*G06F 3/0486* (2013.01)
*G06F 3/04883* (2022.01)

(52) U.S. Cl.
CPC ............ *H04L 51/22* (2013.01); *G06F 3/0486* (2013.01); *G06F 3/04817* (2013.01); *G06F 3/04883* (2013.01)

(58) Field of Classification Search
CPC ... H04L 51/22; G06F 3/04817; G06F 3/0486; G06F 3/04883
USPC .......................................................... 709/206
See application file for complete search history.

(56) References Cited

U.S. PATENT DOCUMENTS

| | | | | |
|---|---|---|---|---|
| 5,428,734 A * | 6/1995 | Haynes | ................. | G06F 3/0486 715/769 |
| 5,764,873 A * | 6/1998 | Magid | .................. | G06F 3/0486 715/769 |
| 6,198,246 B1 * | 3/2001 | Yutkowitz | ............. | G05B 11/42 318/561 |
| 7,337,409 B2 * | 2/2008 | Doblmayr | ............ | G06F 3/0486 715/769 |
| 7,349,010 B2 * | 3/2008 | Bryant | ............... | H04N 1/00185 348/207.1 |
| 7,844,036 B2 * | 11/2010 | Gardner | .................... | G06F 8/34 379/88.08 |
| 8,032,397 B2 * | 10/2011 | Lawless | ................. | G16H 10/60 705/3 |
| 8,600,712 B1 * | 12/2013 | Harvey | ..................... | F42B 4/00 345/632 |
| 8,818,031 B1 * | 8/2014 | Kelly | ................. | G06K 9/00671 382/103 |
| 9,784,837 B1 * | 10/2017 | Olsson | ..................... | G01S 17/66 |
| 2005/0165651 A1 * | 7/2005 | Mohan | .................... | G07F 7/025 705/14.64 |
| 2006/0075033 A1 * | 4/2006 | Bienstock | ............ | G06Q 10/107 709/206 |
| 2006/0075141 A1 * | 4/2006 | Boxenhorn | ........... | G06F 9/5038 709/246 |
| 2006/0109256 A1 * | 5/2006 | Grant | ...................... | G06F 3/016 345/173 |

(Continued)

OTHER PUBLICATIONS

Merriam-Webster, "variable", 2019 (Year: 2019).*
Merriam-Webster, "banner", 2020 (Year: 2020).*
Merriam-Webster, "variable", 2020 (Year: 2020).*

*Primary Examiner* — Ninos Donabed
(74) *Attorney, Agent, or Firm* — Eandi Fitzpatrick LLP (57) ABSTRACT

A processor-based messaging system is provided. The messaging system has a messaging engine in communication with a server, a context engine in communication with the messaging engine; and a reconfirmation engine in communication with messaging engine, the reconfiguration engine configured to utilize at least one variable to reconfigure the user data. A method of messaging is also provided.

10 Claims, 10 Drawing Sheets

(56) References Cited

U.S. PATENT DOCUMENTS

| | | | |
|---|---|---|---|
| 2008/0028323 A1* | 1/2008 | Rosen | G06Q 10/10 715/752 |
| 2008/0183825 A1* | 7/2008 | Alicherry | H04L 51/24 709/206 |
| 2008/0184148 A1* | 7/2008 | Selig | G06F 17/243 715/769 |
| 2009/0193348 A1* | 7/2009 | Banks | G06F 3/04883 715/764 |
| 2009/0300117 A1* | 12/2009 | Nguyen | H04L 51/38 709/206 |
| 2010/0162151 A1* | 6/2010 | Class | G06F 3/0483 715/765 |
| 2010/0228728 A1* | 9/2010 | Weber | G06F 17/30864 707/723 |
| 2010/0241994 A1* | 9/2010 | Wiley | G06F 3/04842 715/832 |
| 2011/0070901 A1* | 3/2011 | Alward | G06Q 30/02 455/466 |
| 2011/0125765 A1* | 5/2011 | Tuli | G06F 17/30035 707/751 |
| 2011/0130168 A1* | 6/2011 | Vendrow | H04M 1/57 455/556.1 |
| 2011/0295163 A1* | 12/2011 | Vijayanagar | A61F 7/02 601/18 |
| 2012/0054646 A1 | 3/2012 | Hoomani | |
| 2012/0059883 A1* | 3/2012 | Yohai-Giochais | G06F 17/3089 709/206 |
| 2012/0072853 A1* | 3/2012 | Krigstrom | G06F 3/0486 715/748 |
| 2012/0101970 A1 | 4/2012 | Zernick | |
| 2012/0115513 A1* | 5/2012 | Han | G06T 19/006 455/456.3 |
| 2012/0158807 A1* | 6/2012 | Woody | G06F 16/2365 708/204 |
| 2012/0184362 A1* | 7/2012 | Barclay | G07F 17/3281 463/25 |
| 2012/0212510 A1* | 8/2012 | Hewitt | G06T 11/00 345/650 |
| 2013/0113936 A1* | 5/2013 | Cohen | G08G 1/14 348/148 |
| 2013/0136370 A1* | 5/2013 | Tai | G06T 11/60 382/224 |
| 2013/0166651 A1* | 6/2013 | Joshi | H04L 65/4015 709/204 |
| 2013/0305167 A1* | 11/2013 | Bastide | H04L 65/4038 715/753 |
| 2013/0325973 A1* | 12/2013 | Chu | H04M 3/42059 709/206 |
| 2014/0019542 A1* | 1/2014 | Rao | G06Q 30/0269 709/204 |
| 2014/0053114 A1* | 2/2014 | Kwon | G06F 3/04817 715/863 |
| 2014/0087699 A1* | 3/2014 | Madajah | H04W 4/12 455/412.2 |
| 2014/0136638 A1* | 5/2014 | Zhang | H04L 51/04 709/206 |
| 2014/0149884 A1 | 5/2014 | Flynn | |
| 2014/0180914 A1* | 6/2014 | Abhyanker | G01C 21/20 705/39 |
| 2014/0196529 A1* | 7/2014 | Cronin | E01C 23/01 73/146 |
| 2014/0324938 A1* | 10/2014 | Gardenfors | H04L 67/10 709/201 |
| 2014/0331187 A1* | 11/2014 | Hicks | G06F 3/0488 715/845 |
| 2015/0003607 A1* | 1/2015 | Choi | H04L 9/0863 380/44 |
| 2015/0026616 A1* | 1/2015 | Litan Sever | G06F 3/04817 715/765 |
| 2015/0032838 A1* | 1/2015 | Demsey | H04L 67/2842 709/213 |
| 2015/0046210 A1* | 2/2015 | Shoham | G06Q 10/1097 705/7.21 |
| 2015/0172238 A1* | 6/2015 | Ahmed | H04L 51/08 709/217 |
| 2015/0195483 A1* | 7/2015 | Miller | B61L 3/002 386/201 |
| 2015/0221112 A1* | 8/2015 | Mallik | G06F 16/7867 345/636 |
| 2015/0295777 A1* | 10/2015 | Cholkar | G06F 3/04842 715/753 |
| 2016/0133230 A1* | 5/2016 | Daniels | G06T 19/006 345/633 |
| 2016/0165128 A1* | 6/2016 | Krug | H04N 5/23216 348/207.1 |

\* cited by examiner

SYSTEM AND METHOD FOR MESSAGING IN A NETWORKED SETTING

FIELD OF THE INVENTION

The present invention relates generally to a messaging platform. More particularly, the present invention relates to a hardware and software implemented system and method that allows messaging by combining and sending predefined messages via a single gesture, motion or decision for haptic and/or non-haptic interfaces. A method for messaging utilizing variables and single gesture output is also provided.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The development of the Internet and wireless protocol has led to a vast increase in human interaction via social networking, messaging platforms and other network applications. This has allowed people (herein also referred to as "users") in various parts of the world to communicate and interact on numerous levels.

Applications such as Whataspp®, Skype®, Viber® and Snapchat® has led to the mass adoption of personal short messages and videos, distributed in (soft) real-time on the Internet by and to a large number of users. These messages are complemented with rich contextual information such as the identity, time and location of the person sending the message (e.g., Facebook® has millions of users sharing their location on a regular basis, with almost 1 million updates per day).

Concurrently, text messaging, push messaging, and multiplayer online games in virtual worlds are popular forms of online and mobile entertainment. Participating in virtual environments, such as social networking sites, MMOG games have become a daily habit for adults and children. In each of these instances, user communication is paramount.

User-to-user communication is typically a prominent feature within any interactive online environment. The actual meaning of the message is sometimes difficult to discern, and context of the message is important. As an example of this, a phone call in the middle of the night from your mother is radically different, contextually, from an email at 10:30 AM on Wednesday from your phone company or office. Understanding the meaning of communication typically requires this contextual information.

Current methods of communications do not account for, or properly leverage, this contextual information, and the combination of variables, which defines the message itself. Rather, current approaches deliver full messaging interfaces even when they are not required. Considering that mobile phone screens are traditionally small, and only a certain number of predetermined words can comfortably fit on a screen without adversely affecting user experience, simplification whilst maintaining necessary information is paramount.

Accordingly, there is a need for a system and method to communicate with peers using messages that can be easily and quickly sent, received, and understood by other users.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

SUMMARY OF THE INVENTION

To achieve the forgoing and other aspects and in accordance with the purpose of the invention, a system, method and computer program product for a messaging system is described.

In an embodiment of the present invention, a messaging system integrating computer hardware, software and firmware, in communication with at least one client, the messaging system comprising: a server configure to receive an input, wherein the input comprises user data; a memory in communication with the server, wherein the memory is configured to store the user data; a context module configured to utilize at least one variable to reconfigure the user data; and a messaging module configured to output a message from the first client.

In an embodiment of the present invention, a system for processor-based messaging the system is provided, the system comprising a messaging engine in communication with a server; a context engine in communication with the messaging engine; and a reconfirmation engine in communication with messaging engine, the reconfiguration engine configured to utilize at least one variable to reconfigure the user data.

In an embodiment of the present invention, a processor-based method for formulating a message on a client having a processor in communication with a server over a network, the method comprising: receiving an input at the server from the client, wherein the input comprises user data; storing the user data in memory on the server; utilizing at least one variable to reconfigure the user data using a reconfiguration module; and outputting a message from the first client using a messaging module.

Other features, advantages, and aspects of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

While exemplary embodiments of the present invention will be described with reference to certain types of messaging systems, a skilled artisan will realize that embodiments of the invention are applicable to different types of messaging systems and platforms.

Figure 1:
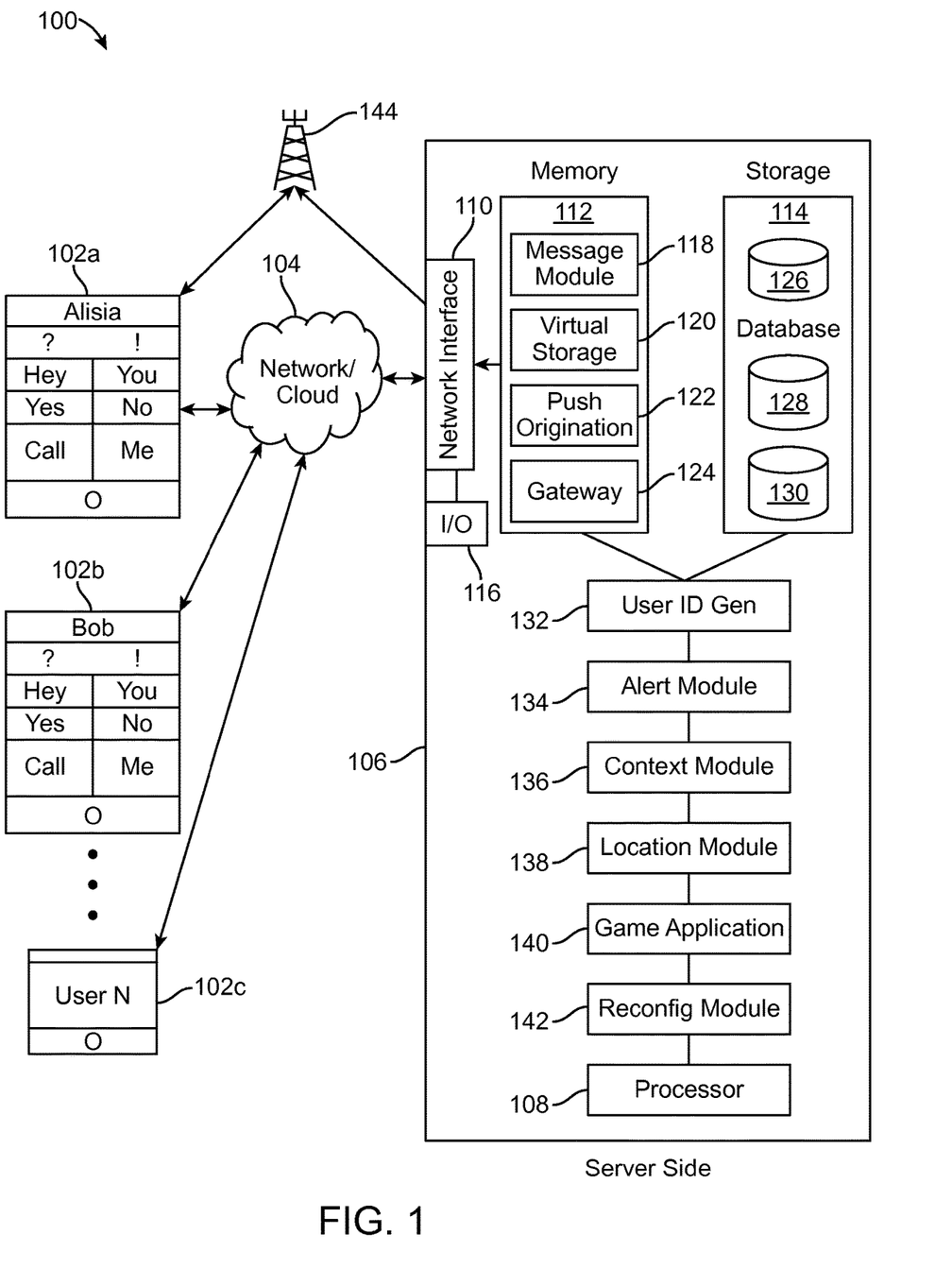
FIG. 1 is a block diagram depicting an exemplary client/server system which may be used by an exemplary web-enabled/networked embodiment of the present invention.

Referring now to FIG. 1, a block diagram depicting an exemplary client/server system which may be used together with an exemplary embodiment of the present invention is shown generally at 100.

Clients 102a, 102b, and 102c (user N) represent user devices at which one or more independent users (also referred to herein as "clients", themselves). The clients 102a-c, in this exemplary embodiment, are smart phones. However, it should be appreciated that clients 102a-c may also include personal digital assistants, tablet devices, e-readers, wireless music devices and any other personal computing device such as desktops and laptops, which includes at least one of a display, processor, memory, input or output means, together with any electronic device that is used as a platform for audio-visual media including games and mobile applications. Further, it should be noted that while only three clients 102a-c are shown, the present methods and systems are applicable to large volume networks in the order of hundreds of thousands or millions of clients, represented by User N 102c.

The clients 102a-c, in an embodiment of the present invention, may be communicatively connected to each other, and further communicably connected to at least a server 106 via global network 104. The server 106 may be in further communication with a computing processor 108.

In this exemplary embodiment of the present invention, client 102a may communicate bi-directionally with the server 106 through network 104 using network interface 110. The global network 104 may comprise the Internet, local area networks (LANs), wide area networks (WANs), wired telephone networks, wireless networks, or any other network supporting data communication between respective clients, developers, servers, and the like.

Client 102a, which in this exemplary embodiment are smart phones, may comprise various known hardware, software, and firmware. For example, the smart phones may comprise a CPU, a sensory representation (a visual, auditory, or tactile output such as a graphic display, a tone, or a vibration), a keyboard/touchpad, a microphone, a memory, a mass memory storage, a graphical user interface, a video camera, an input/output interface and a network interface. The client may also include removable media devices (e.g., memory cards, etc.).

The server 106 may comprise a single processor 108 or multiple processors and various types including microcontrollers (e.g., with embedded RAM/ROM) and microprocessors such as programmable devices (e.g., RISC or CISC based, or CPLDs and FPGAs) and devices not capable of being programmed such as gate array ASICs (Application Specific Integrated Circuits) or general purpose microprocessors.

Memory 112 is used to transfer data and send and receive instructions from the processor in a bi-directional manner. Memory 112, as discussed previously, may include any suitable computer-readable media, intended for data storage, such as those described above excluding any wired or wireless transmissions unless specifically noted.

Memory 112 may comprise messaging module 118, which is configured as short-term volatile memory for messages in cache, and to communicate with storage 114. Virtual storage 120 may be further provided increased speed and security for memory isolation, where needed.

Memory 112 may further comprise push message originator 122, such that if a user elects for push messages, the module is configured to as a push originator, whereas the gateway 124 is provided for SMS messaging though a service provider. For example, a conventional SMS may exchange text messages between phones via a cellular carrier network 144. If required, the sever side comprises an SMS controller (SMSC) to receives text messages generated by client and forwarded through a signaling channel via carrier network 144.

Mass data storage 114 may also be coupled bi-directionally to processor 108 and provide additional data storage capacity and may include any of the computer-readable media described above. Mass data storage 114 may be used to store programs, data and the like and is typically a secondary storage medium such as a hard disk. It will be appreciated that the information retained within mass data storage 114, may, in appropriate cases, be incorporated in standard fashion as part of memory 112 as virtual memory.

In exemplary embodiments of the present invention, the storage 114 may comprise first database 126 for storing, for example, user profiles. Second database 128 may store, for example, context or variable profiles. As used herein, context or variable profiles are meant to define relationships between users and messaging platforms (e.g., SMS, email, social network, game, etc). Third database 130 may store, for example, gaming profiles. Of course, any number of databases may store any number of objects and files, such as geographical location, language, user patterns, and the like.

In exemplary embodiments, the server 106 further comprises user ID generator 132, alert module 134, context module 136, location module 138, game application 140, and reconfiguration module 142 each to be described in greater detail with reference to FIGS. 2-6.

Processor 108 optionally may be coupled to network interface 110 which enables communication with an external device such as a database or a computer or telecommunications or internet network using an external connection shown generally as I/O channel 116, which may be implemented as a hardwired or wireless communications link using suitable conventional technologies. With such a connection, processor might receive information from the network, or might output information to a network in the course of performing the method steps described in the teachings of the present invention. Smartphones may communicate via remote connectivity including, but not limited to the Internet, Satellite networks, Cell Phone networks, other wireless networks and standards such as 802.11, 80211.b, 802.11g, or similar wireless LAN operating standards, or Bluetooth technologies, infrared connections, or any other similar technologies or other technologies such as those described above that permit the sending and/or receiving and/or processing of electronic information in either an encrypted or unencrypted format.

Figure 2:
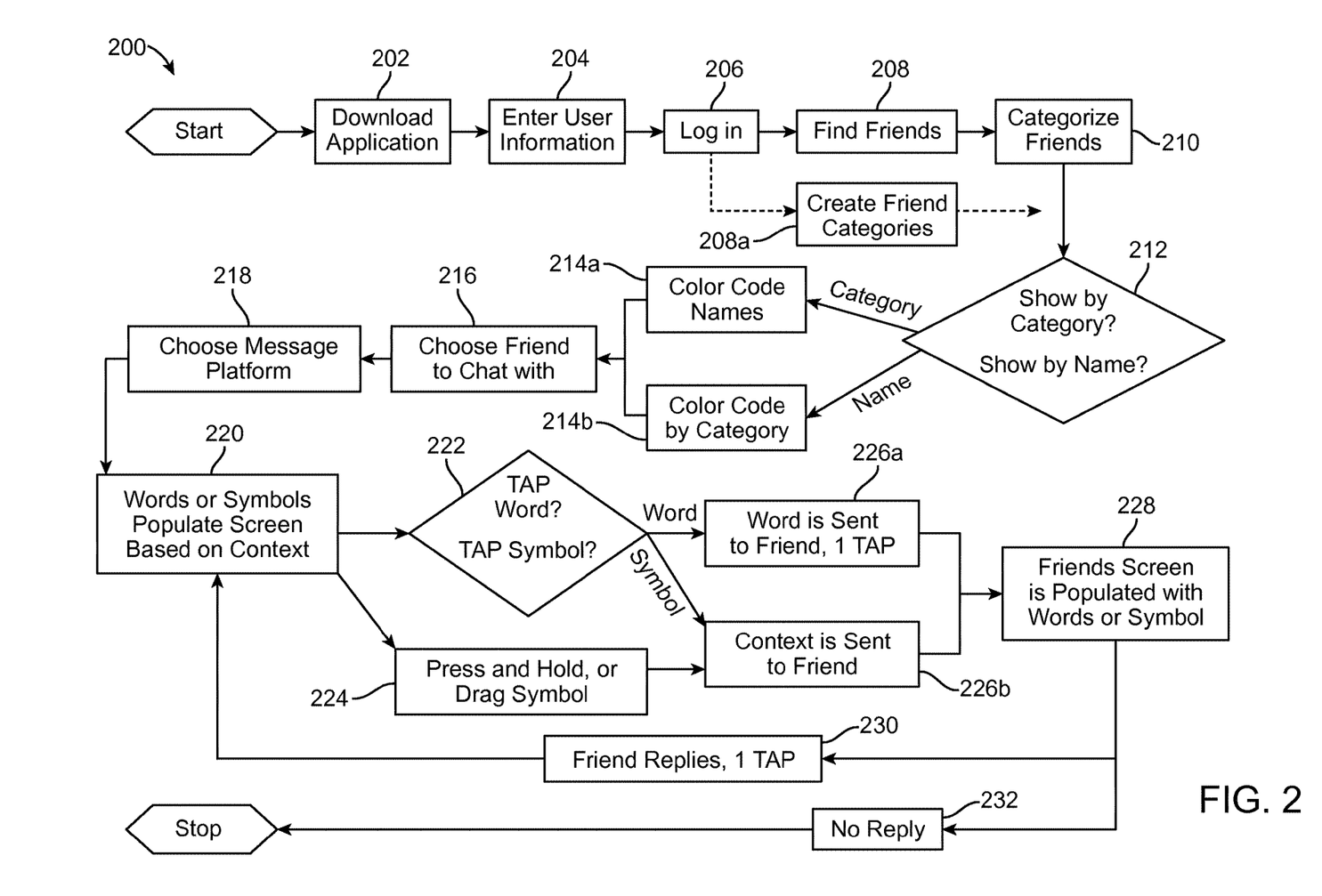
FIG. 2 illustrates a flowchart depicting a method for increasing user value, in accordance with an embodiment of the present invention.

In an embodiment of the present invention, a mobile server 206, through a plurality of processors, software, and firmware, is configured to execute a contextual messaging system as described with relation to the method shown in the flow-chart of the FIG. 2. A user interface (UI) may be incorporated into any type of software application, including, for example, a desktop application, mobile application, or web-based application, to enable users to interact with and control the application. A graphical user interface (GUI) is a type of user interface that enables users to interact with software applications through multi-media objects, including, for example, icons, buttons, menus, images, video, or audios.

Referring now to FIG. 2, there is shown a flow chart to further illustrate a method for messaging; such is in a chat or peer-to-peer environment, at reference numeral 200. The method, executable by the system, will be described with reference to FIG. 1, and client's 102a-c accounts for variables such as but not limited to:

The platform of messaging;
the timing of the message;
the relationship between the users; and
the message itself.

At step 202, a user 102 downloads the messaging application on the user's client device, in this exemplary embodiment, a smart phone. In operation, the user 102 connects to an application store (e.g., Apple App Store, Android Market, MiKandi, Amazon App Store and BlackBerry App World), and the variable sensitive messaging application is fully downloadable, and integratable into any type of client, including non-haptic devices controlled via eye movement or brain waves.

At step 204, the user may enter personal information in the dialog boxes. Personal information may include nickname, phone number, interests, likes, dislikes, and other information. Also, a user may enter predetermined contextual information, such as if he or she plays games. Other contextual information may include address, or an opt-in to geo-location services. Gaming factors may also be included, such as gaming profile types of game play that a user prefers, genres of games played etc. A user profile may also include the language spoken by a user, duration of time spent and frequency of time in the online environment, and duration of time within a sub location within the online environment.

At step 206, the user may log in to contextual messaging application using a user name and password, for example.

At step 208, the user may find friends using his or her telephone contacts and social networking sites, for example. The application is configured to automatically interface with the user's contact list and social media contacts, if the user opts into such an automatic configuration.

At step 210, a user is prompted to categorize the friends who accepted the user's request to opt in to the contextual mobile application. In an optional embodiment, the application provides predetermined categories. For example, the application may have a list of predetermined categories to choose form, such as "Friends", "Family", and "Game" denoting those in your group that the user may typically play games with.

At optional step 208a the user may create customized categories that are not included in the predetermined, but merely exemplary list. For example, user may want to create categories and subcategories which depend upon the context of their conversations. For example, specific locations may be a subcategory for "Friends". Of course, as many categories and subcategories may be created, at the desire of the user.

At step 212, the user may select how they would like to view the UI. In an exemplary embodiment, the user may either show the list of names in alphabetical order, or, show by category in alphabetical order. If the user selects to show contacts by name, in order, the application may color code the names by category step 214a. For example, if a user has three categories "Family", "Friends" and "Games" their contact list may be listed alphabetically, with each of the Family names coded in an opaque red, Friends color coded in a different shade of deep red and Games in a different shade or cooler than the former to provide for a user friendly interface. Optionally, a user may opt to show contacts by category. As such, each category will be assigned a color, such that the user will simply need to tap the category to revel the contacts in that category. This will be described in greater detail with reference to the interactive elements of FIGS. 3-5

At step 216, the user may choose a friend in one of the contextual categories to message and chat with.

At step 220, depending upon the contextual category chosen, words and/or symbols and maps may populate the UI. Depending upon the contextual category the friend is chosen from, the interactive elements of the UI will be different. For example, if the user choose a person in the "Game" category, the UI will relate directly to "game language" by assuming that the two will be engaged in, or engaging in, a type of game. Examples of game language include "gg—Short for Good Game, gl—Short for Good Luck. guild—Another word for clan hp—Short for Health Points, and noob—A derogatory term used for obnoxious players". The application is also configured to change UIs based on the actual game being played, such that specific game-to-game language can be employed. If, on the other hand, the user chooses a person in their friend group to communicate with, the UI will populate with words which have either been preselected, or learned based on past communication. Exemplary words include "Yes", "No", "Later", "Me", "Call" and "Hey". These words are user configurable, and also automatically configurable by the server, using for example, context module 136 of FIG. 1.

As step 222, the user may tap on a word or symbol on the UI. If the user taps on a word, the word is automatically sent, in one-touch fashion to the selected recipient. If the user drags a symbol that relates to text such as "!" or "?", that symbol may be dragged or associated with a predefined phrase or command. The message is created and shown at the moment of association between the symbol and the command or word.

In another exemplary embodiment, the map icon may be a symbol on the UI. If a user taps the map icon, the contextual module 136 is configured to use the devices GPS to send a map to the user's friend with the user's location, which could be shown as a written address, or shown as a icon on a map of the area, in optional embodiments. However dragging "?" on top of the map and releasing it, send the other user the question "Where are you?". This and like-kind features advantageously save space on the UI, particularly in small mobile devices, and saves users time by obviating the need to type full words.

In step 224, a user may also choose to drag words or symbols on and around the UI. For example, if a user presses the UI on a word, the user will then have the ability to drag the word on top of another word of symbol that is also located on the UI. Dragging may change the visual indicator and such that interactive element will become more opaque, and appear to "float" over the other words or symbols on the UI. Once the user has chosen which word or symbol to drag the original word or symbol over, upon release, a new word or contextual symbol forms, and it automatically sent to the user's friend. For example, dragging "Yes" on top of "No" will send the term "Maybe" to the other user upon release. As can be seen, this is done, again, in one-touch fashion, drastically improving the time it takes to message, while also maintaining clarity of and communication. Further examples of this feature may comprise the combinations of: Dragging "Best" over "worst" to form "average", or "one minute" dragged over "1 hour" to form "30 min".

In other exemplary embodiments of the present invention, dragging "Yes" on top of a map icon and releasing it would instantly send a "meet me here!" message coupled with the person's current location, and the icon at the meeting place, with a written address, in optional embodiments. It is important to note that this disclosure contemplates many examples that function similarly to the above-recited examples. Potential interfaces may allow dragging a contact on top of a game icon, and upon release the contact will receive a message communicating an invite to the game.

As a baseline function, in a contextual frame work, the application provides for the ability, using drag, drop and send in one-touch and one motion, for word X and word Y, when coupled, to become word Z, which may be related to words X and Y, or in optional embodiments, be unrelated and simply be user configured. The context module is configured, through various lines of code, to configure these contextual frameworks based on factors such as past use of language, and party relation. The contextual framework also contemplates the use of symbols, such that, using drag, drop and send in one-touch, one motion, symbol A and symbol B, when coupled, become symbol C. Symbols may be, in optional embodiment, shapes, arrows, accents, Greek and Latin letters, math symbols and the like.

In optional embodiments of the present invention, the messaging system may utilize and be implemented via eye movement or brain waves, technology using properly programmed interface.

At step 228, the friends screen is populated with either analogous interactive elements, predetermined user configurable interactive elements, or automatically configurable interactive elements proscribed by the context engine 136.

At step 230, the friend may reply using analogous framework as described with relation to steps 220-228. If the friend does not reply, step 232, the communication ends. If the friend does reply however, step 220 begins again, and a chat session is held.

In exemplary embodiments, while the user interacts with another user or client whose device may not be active, the user may be presented with one or more interactive elements (e.g. on a screen of the computing device such as touch screen 215 or 225) that indicates information to the user, as described in detail above. The interactive element or elements may be displayed in a persistent manner, and, in particular embodiments, when the computing device receives user input selecting an interactive element (e.g., by any of the gestures or actions described above), a user interface is opened by the computing device, as described in detail above.

Module configured chat messages sent among users associated with a given user profile may be used to generate a linguistic profile. The linguistic profile may indicate a frequency of use for terms in messages, or parts of messages, sent between users associated with a given user profile. A predefined number of the most frequently used messages, expressions, terms, acronyms, phrases, idioms, and/or colloquialisms, etc., may be selected to include in the list of expressions. Of course, a variety of approaches may be used to generate the list of expressions. In addition, behavioral traits, actions, sounds, etc., may be associated some of the list of expressions.

Further, as the patterns or frequency of use of terms changes within an online environment (or for a group of users assigned a common profile), the corresponding linguistic profile may be updated. That is, the pre-selected terms presented to users within a given online environment may evolve for a given user group, as the use of language in that online environment (or by the particular user group) evolves, over time. Doing so allows the list of expressions available to be sent as chat messages to remain contextually relevant as the vocabulary or jargon of a given user community changes over time. Further, mappings between the lists of expressions derived from different linguistic profiles may be created, allowing chat messages to be sent across different user communities or online environments.

Figure 3:
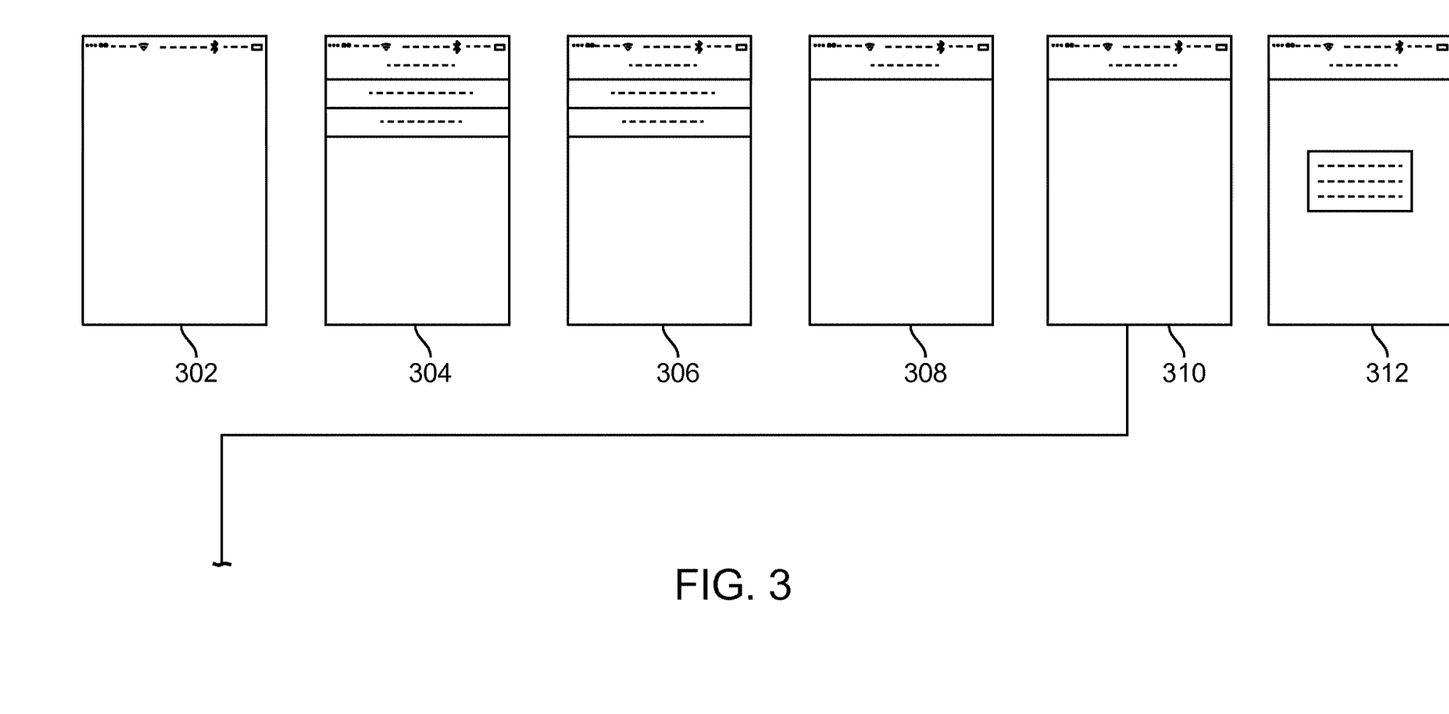
FIG. 3 illustrates exemplary interactive elements and a user interface.

FIG. 3 illustrates a wire framework of illustrating an example UI's, which are set up as a flow diagram 300. Here, interactive elements are displayed on the screen of a smartphone while the user of the smartphone is running and interacting using the messaging platform of the present invention.

At the login screen 302, an entry navigation tab including the ability to tap and log in is included. Also, a sign in tab is included. In steps 304, 306, 308, 310 and 312 are UIs in which the user is prompted for his or her password.

Once logged in, the UI as shown at 314, organizes into tabs to allows the users to locate other friends using the smart phone contact list by telephone number, email, and other well known social media sites.

UI 318 the UI organizes tabs for a plurality of messaging platforms, including but not limited to SMS, mail, Facebook®, and the like.

At UI 320, the user can select a messaging platform, and using the subject variable specific messaging system, because the system is usable with an messaging platform.

The user may then message a selected friend of group of friends as shown in UIs 322, 324, 326 and 328.

At UI 330, the user may group his or her friends into categories to aide the variable specific messaging platform to recognize the context of the message, and account for such variables as platform of messaging. The timing of the message, the relationship between the users, while also recognizing the he message itself to then further define the message.

UIs 332-340 show how messaging platforms can be chosen in the messaging application itself, and how friends can be categorized at a top level on the screen. Each of these tabs for friends, or platforms may be configured as entry navigation tabs to navigate though user categories, communities, and platforms. In an embodiment of the present invention, the one or more categories includes friends, gamers, family, and can include configurable themes, and colors associated each. In optional embodiments, eye tracking tools can be used to navigate through categories. In other optional embodiments, the UIs 340-352 show how friends can be categorized in embodiments of the present invention. For example, a user is prompted to categorize the friends who excepted the user's request to opt in to the contextual mobile application. In an optional embodiment, the application provides predetermined categories. For example, the application may have a list of predetermined categories to choose form, such as "Friends", "Family", and "Game" denoting those in your group that the user may typically play games with.

The user may create customized categories that are not included in the predetermined, but merely exemplary list. For example, user may want to create categories and sub-categories which depend upon the context of their conversations. For example, specific locations may be a subcategory for "Friends". Of course, as many categories and subcategories may created, at the desire of the user.

Figure 4A:
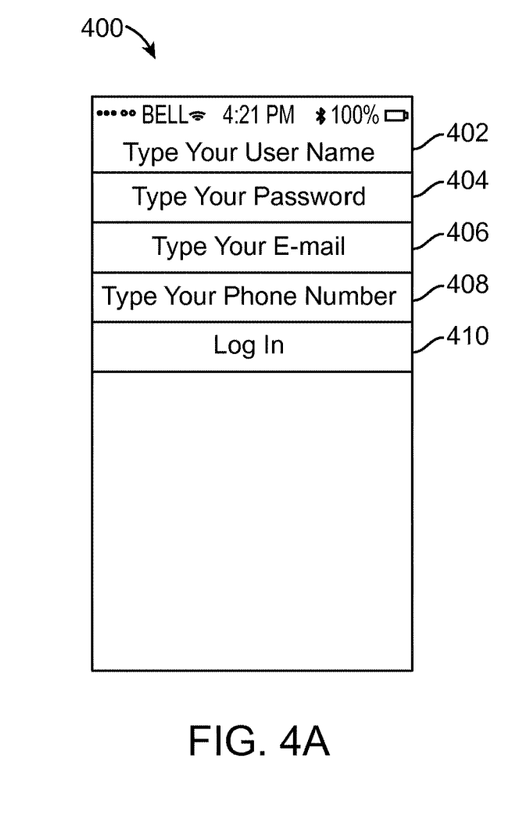
FIGS. 4A-4C illustrate exemplary interactive elements and a user interface.

FIG. 4 illustrates a more detailed UI of the messaging platform, generally shown at panel 400. Once logged in as shown at the UI of FIG. 4a, using the known methods of username 402, password 404, email address 406, phone number 408, or any combination thereof shown at panel 400, a user may begin the use the messaging application using the login button 410.

Figure 4B:
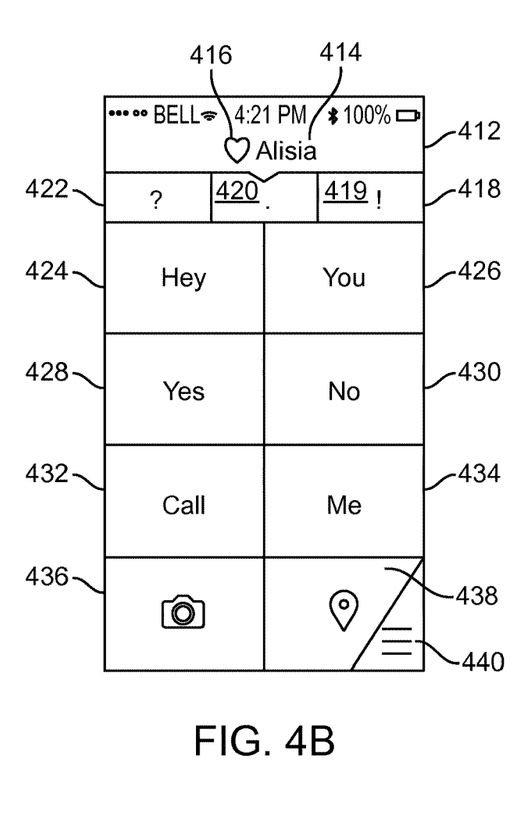
Figure 5A:
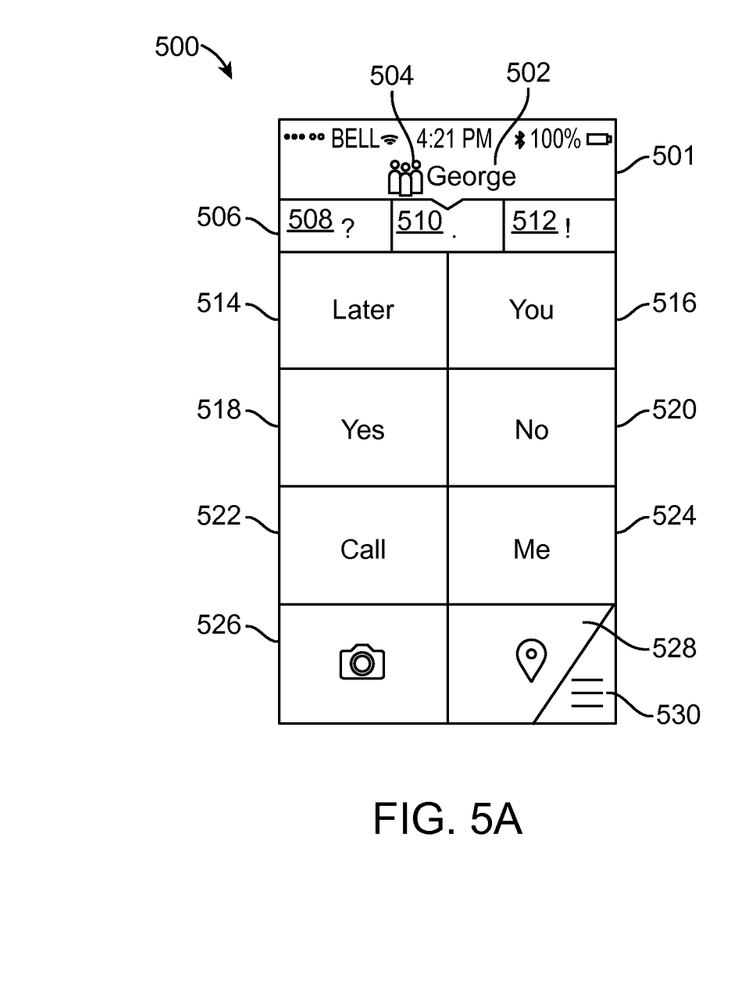
FIGS. 5A-5B illustrate exemplary interactive elements and a user interface.
Figure 5B:
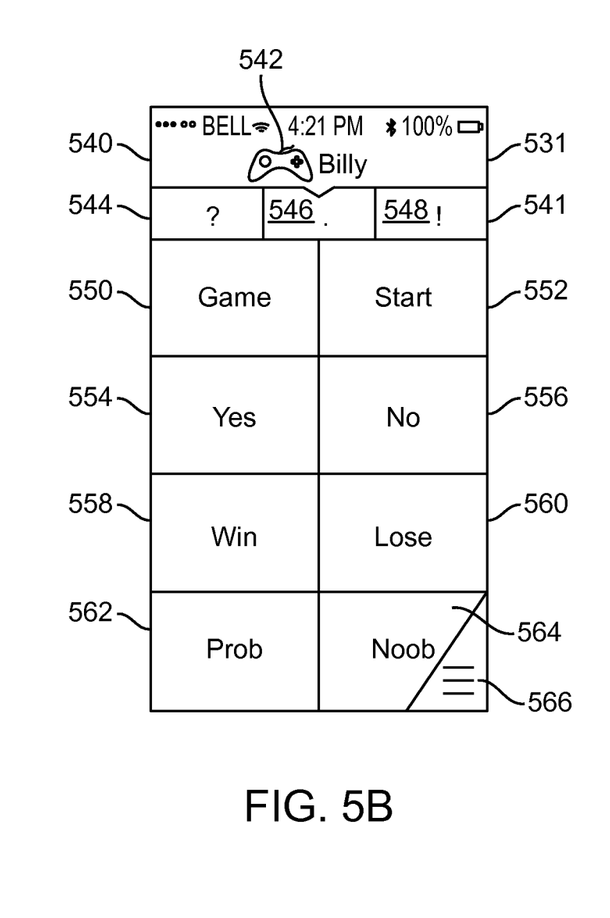

As shown at FIG. 4b, once logged in to the messaging platform and a recipient of a message is chosen, UI 412 is visible to the user. It is important to note however, that the string of words, phrases, and object items shown in this Figure and in FIG. 5 as well for purposes of example only, and not meant to be limiting in any way. The user may configure these words, phrases and object items in some embodiments, and they may be system configured in other embodiments.

In this exemplary embodiment, the recipient of the message is shown as at first banner 414 "Alisa". Next to or proximate to the Alisia is a symbol indicating a grouping, i.e., the relationship between the parties. In this embodiment, a heart is included, which may symbolize a special relationship between loved ones. In other embodiments, another symbol representing a gaming relationship, or a work relationship may exist. The context module 136 of FIG. 1 takes into account this relationship and makes suggestions for terms or objects for inclusion into the messaging system, in some embodiments. The reconfigure module 108 may also use this information set by the user to reconfigure certain term and objects in the UI 412.

A second row banner 418 may comprise punctuation. In this exemplary embodiment, the second row banner comprises an exclamation point 419, a period 420a and a question mark 422, lined in a single row.

Under the second row banner 420, three rows of words, shown in two separate columns, populate the UI 412. In this exemplary embodiment, the word hey appears as Hey 424, You 426, Yes 428, No 430, Call 432, and Me 434. In the final row are objects such as a camera 436 and a GPS location beacon 440. However, in other embodiments, the words may be phrases and may be different than those as shown in this FIG. 4B. In this exemplary UI, the user may tap on a word or symbol on the UI 412. If the user taps on a word, the word is automatically sent in one-touch fashion. If the user drags a symbol that relates to text such as "!" or "?", that symbol and word when overlaid may be associated with a predefined phrase or command. The message is created and shown at the moment of association (e.g., overlaid) between the symbol and the word are sent. Two words if may be combined to form a third word which may be another predefined word, a different predefined word, or a predefined phrase. The GPS location beacon 440, when tapped, may automatically send the recipient the location of the user using maps, whereas the camera 436 may take a photo and send it with a single tap. A menu button 440 is also provided on the main messaging UI 412 located close to a user's thumb for ease of access.

Figure 4C:
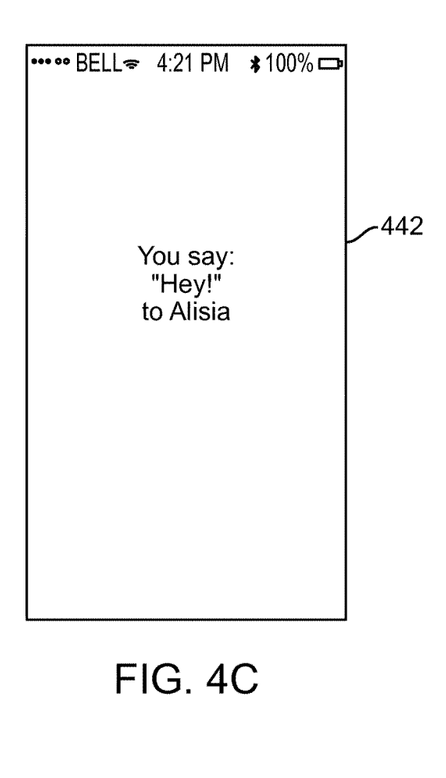

In UI 442, shown in FIG. 4C, the message populates the user's screen, in its entirety, showing, in come embodiments, the top banner in which the time, cellular service range and battery life is present.

FIG. 5 illustrates a more detailed UI of the messaging platform, generally shown at panel 500. In this embodiment shown at 500, the recipient of the message is shown as at first banner 501 as "George". Next to or proximate to the George is a symbol indicating a grouping, i.e., the relationship between the parties. In this embodiment, a group of friends illustration is included, which may symbolize a special relationship between loved ones. In other embodiments, another symbol representing a friend relationship. The context module 136 of FIG. 1 takes into account this relationship and makes suggestions for terms or objects for inclusion into the messaging system, in some embodiments. The reconfigure module 108 may also use this information set by the user to reconfigure certain terms and objects in the UI 501.

A second row banner 506 may comprise punctuation. In this exemplary embodiment, the second row banner comprises an exclamation point 512, a period 510 and a question mark 508, lined in a single row.

Under the second row banner 506, three rows of words, shown in two separate columns, populate the UI 500. In this exemplary embodiment, the word hey appears as Later 514, You 516, Yes 518, No 520, Call 522, and Me 524. In the final row are objects such as a camera 526 and a GPS location beacon 530. However, in other embodiments, the words may be phrases and be different than those as shown in this FIG. 5. In this US the user may tap on a word or symbol on the UI. If the user taps on a word, the word is automatically sent, in one-touch fashion. If the user drags a symbol that relates to text such as "!" or "?", that symbol may be dragged or associated with a predefined phrase or command. The message is created and shown at the moment of association between the symbol and the command or word, or the two words if combined to form a second word. The GPS location beacon, when tapped, may automatically send the recipient the location of the user using maps, whereas the camera 526 may take a photo and send it with a single tap or swipe. A menu button 540 is also provided on the main messaging UI close to a user's thumb for ease of access.

In another optional embodiment at FIG. 5, a UI 531 shows a gaming messaging UI 531 in which the user the recipient of the message is shown as at first banner 541 as "Billy". Next to or proximate to the term Billy is a symbol indicating a grouping, i.e., the relationship between the parties. In this embodiment, a group of a gaming controller illustration is included, which may symbolize a special relationship between users who typically play games with one another. The context module 136 of FIG. 1 takes into account this relationship and makes suggestions for terms or objects for inclusion into the messaging system, in some embodiments. The reconfigure module 108 may also use this information set by the user to reconfigure certain term sand objects in the UI 531.

A second row banner 541 may comprise punctuation. In this exemplary embodiment, the second row banner comprises an exclamation point 548, a period 540 and a question mark 544, lined in a single row.

Under the second row banner 506, three rows of words, shown in two separate columns, populate the UI 531. In this exemplary embodiment, the word hey appears as game 550, Start 552, Yes 554, No 556, Winn 558, and lose 560, Prob 562 and Noob 564. In this UI, the user may tap on a word or symbol on the UI. If the user taps on a word, the word is automatically sent, in one-touch fashion. If the user drags a symbol that relates to text such as "!" or "?", that symbol may be dragged or associated with a predefined phrase or command. The message is created and shown at the moment of association between the symbol and the command or word, or the two words if combined to form a second word. In exemplary embodiments, a user may drag "?" over on top of "Game" and the phrase "Do you want to play a Game?" is sent.

Also, in this exemplary embodiment, if the user choose a person in the "Game" category, the UI will relate directly to "game language" by assuming that the two will be engaged in, or engaging in a game. Examples of game language include "gg—Short for Good Game, gl—Short for Good Luck. guild—Another word for clan hp—Short for Health Points, and noob—A derogatory term used for obnoxious players".

In each of these UIs, the user may tap on a word or symbol on the UI. If the user taps on a word, the word is automatically sent, in one-touch fashion. If the user drags a symbol that relates to text such as "!" or "?", that symbol may be dragged or associated with a predefined phrase or command. The message is created and shown at the moment of association between the symbol and the command or word, and sent with a single gesture.

Figure 6A:
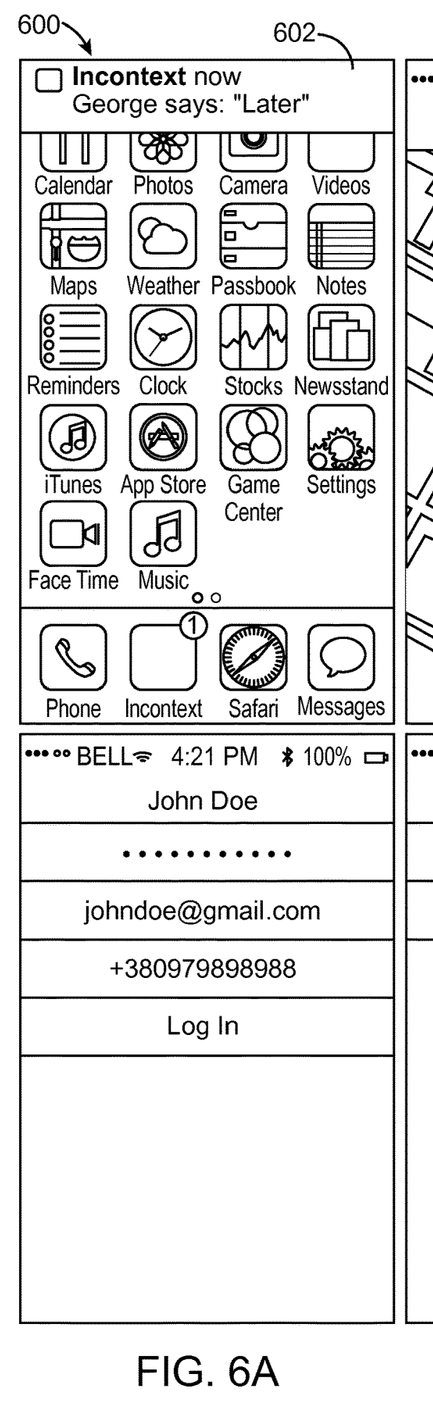
FIGS. 6A-6B illustrate exemplary interactive elements and a user interface.
Figure 6B:
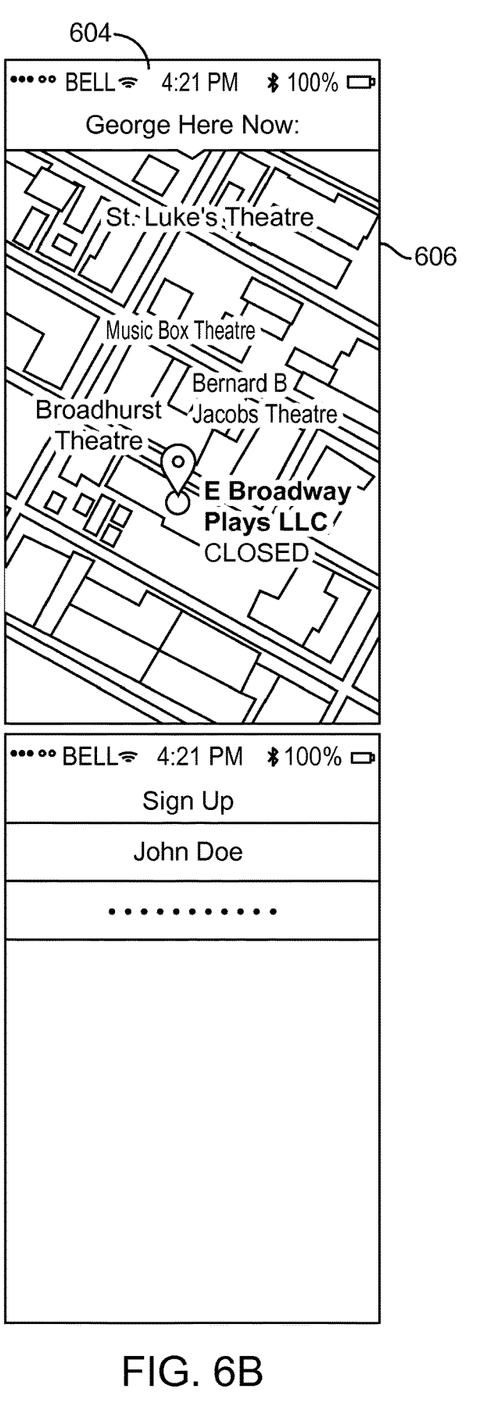

However dragging "?" on top of the map and releasing it, send the other user the question "Where are you?", in a single gesture. This and like-kind features advantageously save space on the UI particularly in small mobile devices, and saves users time by obviating the need to type full words Turning now to FIG. 6, a more detailed UI of how a message may show up on a receipts mobile device as shown at 600. Optionally, the message may show up in a top batter 602, which has the ability be pulled down as is known in the art. If a user taps on the banner, the application may then pull up so that a reply may be sent. In this embodiment, John Doe can see that George has sent him a message, and he may reply, using the messaging platform, "where are you"? George can then use his UI, in a single gesture, to show John where he is, as shown at UI 604, using object 606. However dragging "?" on top of the map and releasing it, send the other user the question "Where are you?" in a single gesture. This and like-kind features advantageously save space on the UI particularly in small mobile devices, and saves users time by obviating the need to type full words The reconfigure module 108 may also use this information set by the user to reconfigure certain term sand objects in the UI 501.

Like in other optional embodiments of the present invention, the messaging system may utilize and be implemented via eye movement or brain waves, technology using properly programmed interface.

Figure 7:
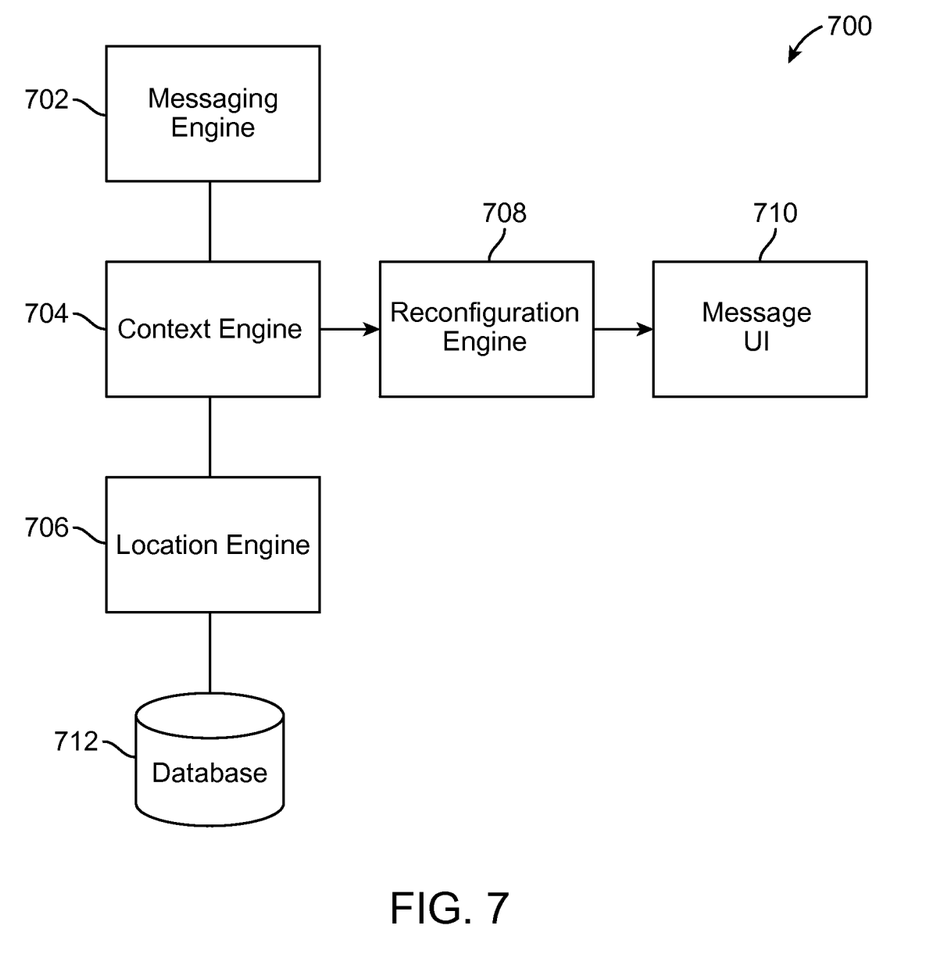
FIG. 7 is a diagram of a system for sending and messages, in accordance with an embodiment of the present invention.

Referring now to FIG. 7, shown generally at 700 is a high-level for messaging system in accordance with exemplary embodiments of the present invention. The system may comprise a messaging engine 702, a context engine 704, a location engine 706, a reconfiguration engine 708 and a database 712.

The messaging engine 702, in exemplary embodiments, is configured to communicate with context engine 706 and location engine 706. The messaging engine 702 is further configured to output messages from a first user to a second user.

The context engine 704, in exemplary embodiments, is configured to categorize a users contacts or friends that may exist in a messaging device. As an example only, the context engine 704 may categorize contacts as "Friends", "Family", and or "Games" denoting those in your group that the user may typically play games with. Optionally, the user may create customized categories using the context engine.

The reconfiguration engine 706, in exemplary embodiment, is configured to populate a UI. Depending upon the contextual category the friend is chosen from, the interactive elements of the UI may change. In operation, the user may tap on a word or symbol on the populated UI.

The location engine 708 is configured to communicate with a GPS in order to ascertain the location of a device. In an exemplary embodiment, the map icon may be a symbol on a UI, and if a user taps the map icon, via the contextual engine 702, is configured to use the devices GPS to send a map or location.

Each of the engines 702, 704, and 706 are in communication with database 712. In exemplary embodiments of the present invention, the database may comprise hardware, software and firmware for storing context or variable profiles, gaming profiles and the like. Of course, any number of databases may store any number of objects and files, such as geographical location, language, and user patterns as an example.

The system 700, through the various engines discussed in relation to FIG. 7, is in communication with a messaging UI 710.

Importantly, the messaging system is fully configurable and any messaging system including those implemented via eye movement or brain waves, and other "hands free" systems While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

We claim:

1. A messaging system comprising:
    a server configured to receive inputs from a first user and a second user;
    a first client having a first graphical user interface (GUI) associated with the first user in communication with a second client having a second graphical user interface (GUI) associated with the second user, wherein the first client and second client are in communication via the server, wherein the first client and second client enable a first user at the first client and a second user at the second client to interact with each other using the first GUI and the second GUI, respectively;
    a memory in communication with the server for storing user data;
    a reconfiguration module residing on the server to define a variable, wherein the variable is a messaging platform, and wherein the reconfiguration module is configured to populate the first GUI on the first client based on the defined messaging platform;
    a context module residing on the server and in communication with the reconfiguration module and a database, wherein a relationship between the first user and the second user is retrieved from the database by the context module, wherein the context module configures the first GUI with interactive elements based on the relationship between the first user and second user and a tactile output from a sensor on the GUI that starts a game upon release of a contact;
    an identification generator residing on the server for generating a user profile based on the user data;
    a location module residing on the server for retrieving a location data for the user;
    wherein the context module is further configured to automatically populate the second GUI with analogous interactive elements as the first GUI;
    a messaging module residing on the server and in communication with the context module and reconfiguration module, wherein the messaging module is configured to automatically send a message upon a sensed gesture proximate the interactive element.

2. The system of claim 1, wherein the at least one variable further comprises:
    a timing of the message;
    a relationship between a first user and a second user;
    a content of the message; or
    the user data.

3. The system of claim 1, wherein the reconfiguration module groups contacts into at least one contextual group, wherein the at least one contextual group comprises friends, family, and games.

4. The system of claim 1, wherein the first and second client comprise eye tracking implementation, wherein the gesture is eye movement.

5. The system of claim 1, wherein the interactive element comprises a camera icon that takes and sends a photo with the sensed gesture.

6. A method for messaging over a network, comprising:
    receiving an inputs at a server from a first client and a second client, wherein the server is in communication with the first client and the second client via the network, wherein the first client comprises a first graphical user interface (GUI) associated with a first user and a second graphical user interface (GUI) associated with a second user;
    storing the inputs in memory on the server;
    defining, using the reconfiguration module residing on the server, a variable, wherein the variable is a messaging platform;
    reconfiguring the first GUI on the first client in response to the defined messaging platform using the reconfirmation module residing on the server;
    accessing a database, via a context module, to retrieve a relationship between the first user and the second user;
    generating a user profile based on the user data using an identification generator residing on the server
    retrieving a location data for the user using a location module residing on the server;
    automatically populating the first GUI with interactive elements based on the retrieved relationship between the first and second user and tactile output from a sensor on the GUI that initiates a game upon release of a contact, and wherein the context module is further configured to automatically populate the second GUI with the analogous interactive elements as the first GUI;
    sending a message upon a sensed gesture proximate the interactive element using a messaging module residing on the server and a sensor on the first GUI, second GUI or both.

7. The method of claim 6, wherein the at least one variable comprises:
    a timing of the message;
    a relationship between a first user and a second user, wherein the first and second users are associated with the first client and a second client respectively;

a content of the message; or the user data.

8. The method of claim 6, further comprising reconfiguring contacts into at least one contextualized group, wherein the at least one group comprises friends, family, games, or any combination thereof.

9. The method of claim 6, wherein the messaging system is downloadable to the client from the server, wherein the client comprises a mobile device having non-haptic functions.

10. The method of claim 6, wherein the interactive element comprise a camera icon that takes and sends a photo with the sensed gesture.

* * * * *